US012044174B2

(12) United States Patent
Lacoste et al.

(10) Patent No.: US 12,044,174 B2
(45) Date of Patent: Jul. 23, 2024

(54) ADJUSTABLE FUEL INJECTOR FOR FLAME DYNAMICS CONTROL

(71) Applicant: KING ABDULLAH UNIVERSITY OF SCIENCE AND TECHNOLOGY, Thuwal (SA)

(72) Inventors: Deanna A. Lacoste, Thuwal (SA); Thibault F. Guiberti, Thuwal (SA); Amit Katoch, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 18/030,143

(22) PCT Filed: Sep. 21, 2021

(86) PCT No.: PCT/IB2021/058594
§ 371 (c)(1),
(2) Date: Apr. 4, 2023

(87) PCT Pub. No.: WO2022/079523
PCT Pub. Date: Apr. 21, 2022

(65) Prior Publication Data
US 2023/0332544 A1    Oct. 19, 2023

Related U.S. Application Data

(60) Provisional application No. 63/118,065, filed on Nov. 25, 2020, provisional application No. 63/091,487, filed on Oct. 14, 2020.

(51) Int. Cl.
*F23R 3/36* (2006.01)
*F02C 7/22* (2006.01)
(Continued)

(52) U.S. Cl.
CPC ............ *F02C 7/22* (2013.01); *F02C 9/28* (2013.01); *F23N 5/245* (2013.01); *F23R 3/36* (2013.01);
(Continued)

(58) Field of Classification Search
CPC ........................................ F23D 2900/14481
See application file for complete search history.

(56) References Cited

U.S. PATENT DOCUMENTS 4,761,948 A * 8/1988 Sood ................... F23R 3/36
                                                    60/39.463
5,207,064 A * 5/1993 Ciokajlo ............. F23R 3/34
                                                    60/737
(Continued)

FOREIGN PATENT DOCUMENTS

EP    3220050 A1 *  9/2017
EP    3220050 A1    9/2017

OTHER PUBLICATIONS

Guiberti, T.F., et al., "Analysis of topology Transitions of Swirl Flames Interacting with the Combustor Side Wall," Combustion and Flame, Sep. 7, 2015, vol. 162, pp. 4342-4357, Elsevier Inc.
(Continued)

*Primary Examiner* — Craig Kim
*Assistant Examiner* — Marc J Amar
(74) *Attorney, Agent, or Firm* — PATENT PORTFOLIO BUILDERS PLLC (57) ABSTRACT

An adjustable injector system for adjusting a radial distribution of a mixed fuel includes an adjustable injector configured to receive first and second non-carbon fuels and configured to adjust the radial distribution of the mixed fuel with a movable part, wherein the mixed fuel is obtained from mixing the first non-carbon fuel with the second non-carbon fuel; a sensor configured to determine an insta-
(Continued)

bility of a flame generated by the mixed fuel; and a controller electrically connected to the adjustable injector and the sensor, and configured to change a configuration of the adjustable injector, based on an input signal from the sensor, to control the radial distribution of the mixed fuel.

20 Claims, 7 Drawing Sheets

(51) Int. Cl.
 *F02C 9/28* (2006.01)
 *F23N 5/24* (2006.01)
 *F02C 3/22* (2006.01)
 *F23R 3/14* (2006.01)

(52) U.S. Cl.
 CPC ........ *F02C 3/22* (2013.01); *F23C 2900/9901* (2013.01); *F23D 2204/00* (2013.01); *F23D 2900/14481* (2013.01); *F23N 2237/08* (2020.01); *F23R 3/14* (2013.01); *F23R 2900/00002* (2013.01)

(56) References Cited

U.S. PATENT DOCUMENTS

| | | | | |
|---|---|---|---|---|
| 5,327,718 | A * | 7/1994 | Iwata | F23R 3/12 60/773 |
| 5,636,510 | A * | 6/1997 | Beer | F23R 3/14 60/39.23 |
| 5,664,412 | A * | 9/1997 | Overton | F23R 3/26 60/39.23 |
| 5,809,769 | A * | 9/1998 | Richards | F23N 5/16 60/725 |
| 6,199,367 | B1 * | 3/2001 | Howell | F23R 3/14 60/39.23 |
| 6,263,663 | B1 * | 7/2001 | Grienche | F23R 3/26 60/794 |
| 6,272,842 | B1 | 8/2001 | Dean | |
| 8,850,821 | B2 | 10/2014 | Khan et al. | |
| 11,732,659 | B2 * | 8/2023 | Swann | F02C 9/28 60/39.27 |
| 2009/0133379 | A1 | 5/2009 | Mendoza et al. | |
| 2010/0146983 | A1 * | 6/2010 | Hellat | F23R 3/286 60/737 |
| 2011/0137536 | A1 | 6/2011 | Tonno et al. | |
| 2012/0208137 | A1 * | 8/2012 | Kirzhner | F23R 3/36 431/12 |
| 2014/0157785 | A1 * | 6/2014 | Bathina | F02C 9/40 60/737 |
| 2015/0285505 | A1 | 10/2015 | Stevenson et al. | |
| 2015/0362194 | A1 * | 12/2015 | Ogata | F23R 3/286 60/39.463 |
| 2018/0016992 | A1 * | 1/2018 | Kalya | F02C 9/28 |

OTHER PUBLICATIONS

Guiberti, T.F., et al., "Impact of Heat Loss and Hydrogen Enrichment on the Shape of Confined Swirling Flames," Proceedings of the Combustion Institute, 2015 (available online Jun. 27, 2014), vol. 35, pp. 1385-1392, Elsevier Inc.

International Search Report in corresponding/related International Application No. PCT/IB2021/058594, date of mailing Feb. 1, 2022.

Kim, K.T., et al., "Characterization of Forced Flame Response of Swirl-Stabilized Turbulent Lean-Premixed Flames in a Gas Turbine Combustor," Journal of Engineering for Gas Turbines and Power, Apr. 2010, vol. 132, pp. 041501-1-041501-8.

Lacoste, D.A., et al., "Transfer Functions of Laminar Premixed Flames Subjected to Forcing by Acoustic Waves, AC Electric Fields, and Non-Thermal Plasma Discharges," Proceedings of the Combustion Institute, 2017 (available online Jun. 23, 2016), vol. 36, Issue 3, pp. 4183-4192, Elsevier Inc.

Written Opinion of the International Searching Authority in corresponding/related International Application No. PCT/IB2021/058594, date of mailing Feb. 1, 2022.

* cited by examiner

ADJUSTABLE FUEL INJECTOR FOR FLAME DYNAMICS CONTROL

CROSS-REFERENCE TO RELATED APPLICATIONS

This application is a U.S. National Stage Application of International Application No. PCT/162021/058594, filed on Sep. 21, 2021, which claims priority to U.S. Provisional Patent Application No. 63/091,487, filed on Oct. 14, 2020, entitled "ADJUSTABLE DUAL FUEL INJECTOR FOR CONTROL OF FLAME DYNAMICS IN CARBON FREE COMBUSTION SYSTEMS," and U.S. Provisional Patent Application No. 63/118,065, filed on Nov. 25, 2020, entitled "ADJUSTABLE FUEL INJECTOR FOR FLAME DYNAMICS CONTROL," the disclosures of which are incorporated herein by reference in their entirety.

BACKGROUND

Technical Field

Embodiments of the subject matter disclosed herein generally relate to a system and method for controlling the flame dynamics in a combustion system, and more particularly, to an adjustable fuel injector that controls a radial distribution of two or more fuels in a combustion chamber of the combustion system.

Discussion of the Background

The number and variety of renewable energy sources is steadily increasing, but all of them (e.g., wind, solar) are mostly of non-dispatchable nature, i.e., their instantaneous output cannot be quickly increased as required by spikes in the industry and domestic energy consumption. In other words, if the power demand on a certain day at a certain time spikes, for any reason, e.g., a hot day, the renewable energy sources cannot scale up their output to meet that demand. To the contrary, the traditional power sources (e.g., power sources based on gas) can increase or decrease their output in a very short time by adjusting the amount of fuel that is burnt. However, the price paid for this on demand power adjustment is the pollution generated by such power sources.

The interplay of the renewable energy sources with the modern high-efficiency carbon-based power systems is challenging because the renewable energy sources are unable to quickly respond to load variations. To address this issue, one solution is to use large-scale energy storage systems, that can store energy from the renewable energy sources when their output is not necessary (e.g., not all the output from the wind sources during the night is required). One of the options for the required large-scale energy storage systems for renewable resources is based on hydrogen carriers, such as hydrogen ($H_2$) and ammonia ($NH_3$).

At the same time, use of fossil fuel can be decarbonized through pre-combustion carbon capture, leading again to hydrogen or the more storage-friendly ammonia. This strategy has multiple advantages: first, the energy is available independent of the time of production; second, the current infrastructure for power generation can be adapted to these new fuels; and, finally, combustion of these carbon-free fuels does not release carbon dioxide into the atmosphere.

An aspect of utmost importance in gas turbine combustors is the dynamic flame stability, also referred to as combustion dynamics/instabilities or thermo-acoustic instabilities. The susceptibility of the flames to upstream perturbations in the combustors and their coupling with resonant combustor modes has been one of the biggest challenges in the development of modern high-efficiency, low-emission gas turbine combustors in recent decades [1]. The occurrence of combustion instabilities is generally considered as one of the highest risk items in new engine development. While analysis and simulation of thermo-acoustic stability has made great progress in recent years, fully predictive modeling is still challenging.

Introducing fuel variability due to the different fuels that are mixed in the combustor amplifies the uncertainty in the combustor—acoustic interactions; therefore, the dynamic stability of the hydrogen-ammonia flames need to be controlled in the development of carbon-free gas turbine technology. To the knowledge of the inventors, there is no reliable and inexpensive controller for controlling a radial distribution of two or more fuels in a gas turbine or industrial burner.

Thus, there is a need for a new system that controls the radial distribution of the mixture of fuels that are injected into a combustor so that the flame dynamics is stable.

BRIEF SUMMARY OF THE INVENTION

According to an embodiment, there is an adjustable injector system for adjusting a radial distribution of a mixed fuel. The adjustable injector system includes an adjustable injector configured to receive first and second non-carbon fuels and configured to adjust the radial distribution of the mixed fuel with a movable part, wherein the mixed fuel is obtained from mixing the first non-carbon fuel with the second non-carbon fuel, a sensor configured to determine an instability of a flame generated by the mixed fuel, and a controller electrically connected to the adjustable injector and the sensor, and configured to change a configuration of the adjustable injector, based on an input signal from the sensor, to control the radial distribution of the mixed fuel.

According to another embodiment, there is an adjustable injector for adjusting a radial distribution of a mixed fuel, and the adjustable injector includes a body having a first fuel chamber configured to receive a first non-carbon fuel, a second fuel chamber configured to receive a second non-carbon fuel, and a third mixed fuel chamber configured to receive the mixed fuel, which is a mixture of the first fuel and the second fuel, a tube that extends into the first and second fuel chambers when the tube is in a fully retracted state, and extends into the first and second fuel chambers and the third mixed fuel chamber when the tube is in a fully extended state, and an actuator connected to the tube and configured to translate the tube along a longitudinal axis of the body, between the fully retracted position and the fully extend position, to adjust a radial distribution of the first and second non-carbon fuels inside the mixed fuel.

According to yet another embodiment, there is a method for controlling a radial distribution of a mixed fuel within a combustion chamber of a gas turbine. The method includes detecting with a sensor a fluctuation of a flame within a combustion chamber, transferring from the sensor to a controller a signal indicative of the fluctuation of the flame, determining in the controller an amplitude of the fluctuation of the flame, based on the signal indicative of the fluctuation of the flame, comparing the determined amplitude of the fluctuation of the flame with a given threshold value, and instructing an adjustable injector to change a radial distribution of first and second non-carbon fuels inside the combustion chamber to decrease the amplitude of the fluctuation of the flame. The first and second non-carbon fuels generate the flame.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to maintaining the flame stability in a gas turbine combustor that uses a carbon free combustion process. However, the embodiments to be discussed next are not limited to a gas turbine, but may be applied to other industrial burners that use two or more fuels.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a novel adjustable dual-fuel injector for control of flame dynamics in a carbon-free combustion system is introduced. This system takes advantage of the extreme combustion properties of hydrogen and ammonia in an injection system that includes a way to actively control the combustion dynamics by tailoring the radial distribution of the two fuels at the entrance of the combustion chamber. Therefore, the novel adjustable dual-fuel injector based system aims at combining an injection system with an actuator for the control of the flame dynamics in carbon free combustion systems such as gas turbine engines or industrial burners. For simplicity, herein, a system that uses two carbon free fuels is discussed. Those skilled in the art would understand that more than two fuels may be used with the novel system.

Figure 1:
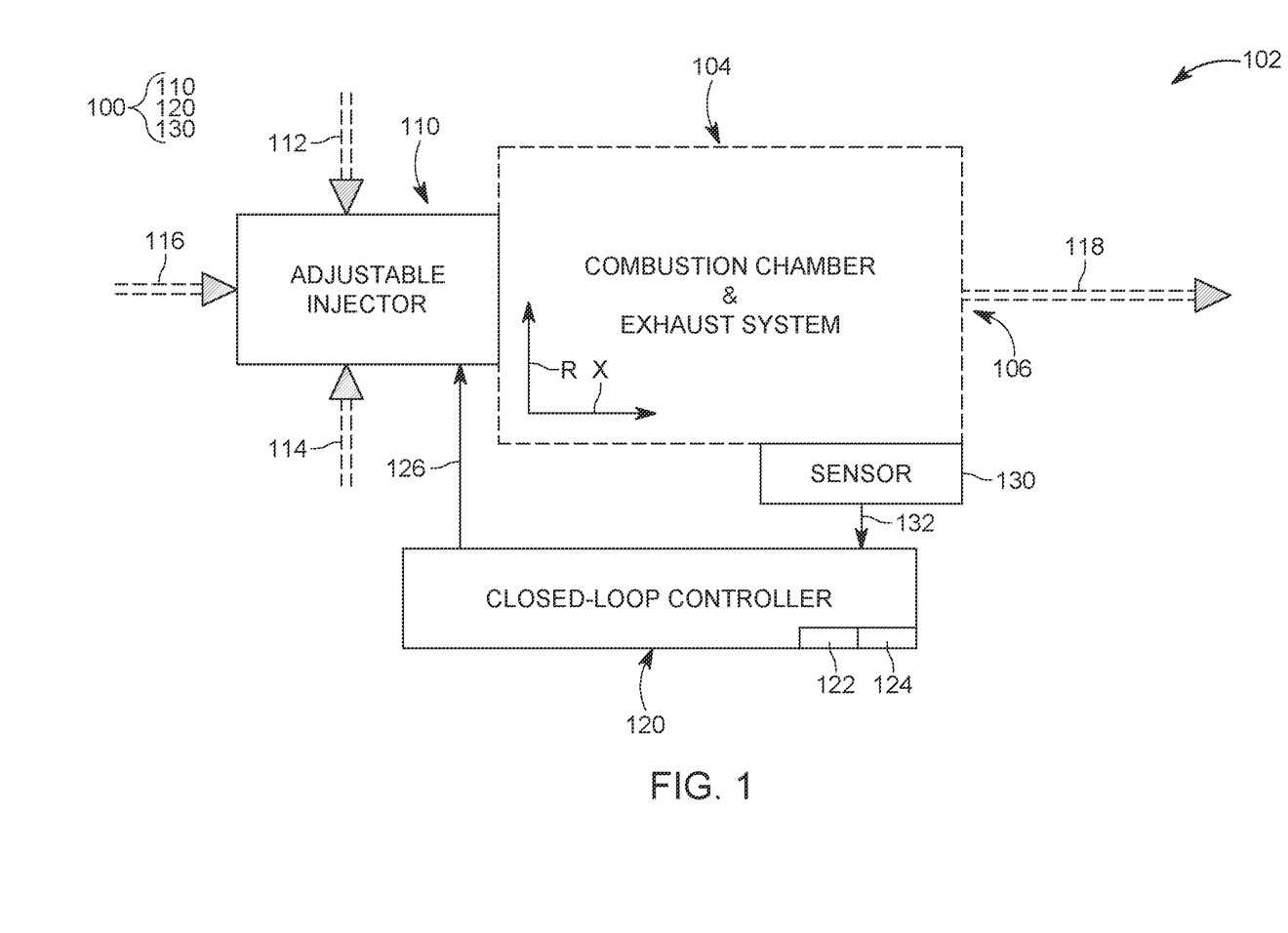
FIG. 1 is a schematic diagram of an adjustable injector system that is configured to control a radial distribution of components of a mixed fuel, which is injected into a combustion chamber.

In one embodiment, as illustrated in FIG. 1, a gas turbine 102 is provided with an adjustable injector 110 that is configured to inject two non-carbon fuels 112 and 114 (for example, hydrogen and ammonia, but other gases may also be used) and air 116 in a combustion chamber 104, with real time control of the spatial distribution of the two fuels 112 and 114. The combustion chamber 104 has an exhaust port 106 through which the flue gases 118 are discharged outside the system. Note that the gas turbine 102 is shown with a dash line in the figure as this element can be replaced with any other existing gas turbine, industrial burner, future gas turbines, etc. The adjustable injector 110 is coupled to a control system 120 (herein called controller) that is connected to one or more sensors 130 for monitoring the combustion chamber's flame dynamics. The sensor 130 can be installed in the combustion chamber and can be configured to receive information about the flame dynamics. For example, the sensor 130 can be a pressure probe that determines the pressure associated with the flame, an optical sensor possibly equipped with an optical filter and configured to determine a light intensity emitted by the flame, or a camera that is also configured to determine a light intensity emitted by the flame.

The control system 120 is configured to receive readings 132 from the sensor 130 as input and then, using an internal processor 122 and memory 124, to process the sensor signals 132 as discussed later, and yield an output signal 126, which is fed to the injector 110, for adjusting a radial distribution of the fuel in the combustion chamber 104. FIG. 1 schematically illustrates how the combustion chamber 104 extends along a longitudinal axis X, and also has a radial axis R, which is perpendicular to the longitudinal axis. The adjustable injector 110 also extends along the longitudinal axis X and injects the fuel along the longitudinal axis X. As discussed later, at least a part of the adjustable injector 110 is configured to move (translate) along the longitudinal axis X to control the radial distribution of the injected fuel, along the radial direction R, inside the combustion chamber 104.

The adjustable injector 110, the controller 120, and the sensor 130 form an adjustable, multi-fuel, injector system 100. The adjustable, multi-fuel, injector system 100 can be used in any combustion system that burns two non-carbon fuels, e.g., hydrogen and ammonia, at any pressure. For example, the adjustable, multi-fuel, injector system 100 can be retroactively installed in existing gas turbine engines, to help in transitioning from fossil fuels to carbon free fuels. The system 100 can also be integrated, at the design stage, into the next generation of the gas turbine engines for power generation. An industrial burner or heater, burning hydrogen and ammonia at any pressure between ambient and 40 bar is also an example of a combustion system that could host and benefit from the adjustable, multi-fuel, injector system 100.

In an embodiment, the adjustable, multi-fuel, injector system 100 is expected to work with two carbon-free fuels, one that has a high heating value and a high reactivity and one that has a low heating value and a low reactivity. If a radial distribution of the mixture of the two fuels can be controlled, then the dynamics of the flame when burning these two fuels can be controlled, so that the flame is stable. For the specific example discussed in this embodiment, the hydrogen is a first fuel that releases a large amount of heat and burns in a very fast manner in air. For example, the hydrogen is known to have a high heating value of about 120 MJ/kg, and a laminar burning velocity at stoichiometry, in atmospheric air, is about 2 m/s. At the opposite end of the spectra, the ammonia is the second fuel, is slow to burn, and does not release much heat. The ammonia has a laminar burning velocity, at stoichiometry, in atmospheric air, of about 0.07 m/s, and a low heating value of about 19 MJ/kg.

The adjustable, multi-fuel, injector system 100 takes advantage of these extreme combustion properties to tailor the flame shape by adjusting the radial distribution of the mixture of the fuels, and therefore to control its dynamics.

Indeed, as shown for example in [2, 3], the shape of the flame has a dramatic impact on the response of the flame to acoustic perturbations and, therefore, on its susceptibility to thermo-acoustic instabilities. In addition, as shown for example in [3, 4, 5], replacing a fraction of a conventional fuel (such as natural gas) with hydrogen strongly affects the shape of the flames and their response to acoustic perturbations.

Figure 2A:
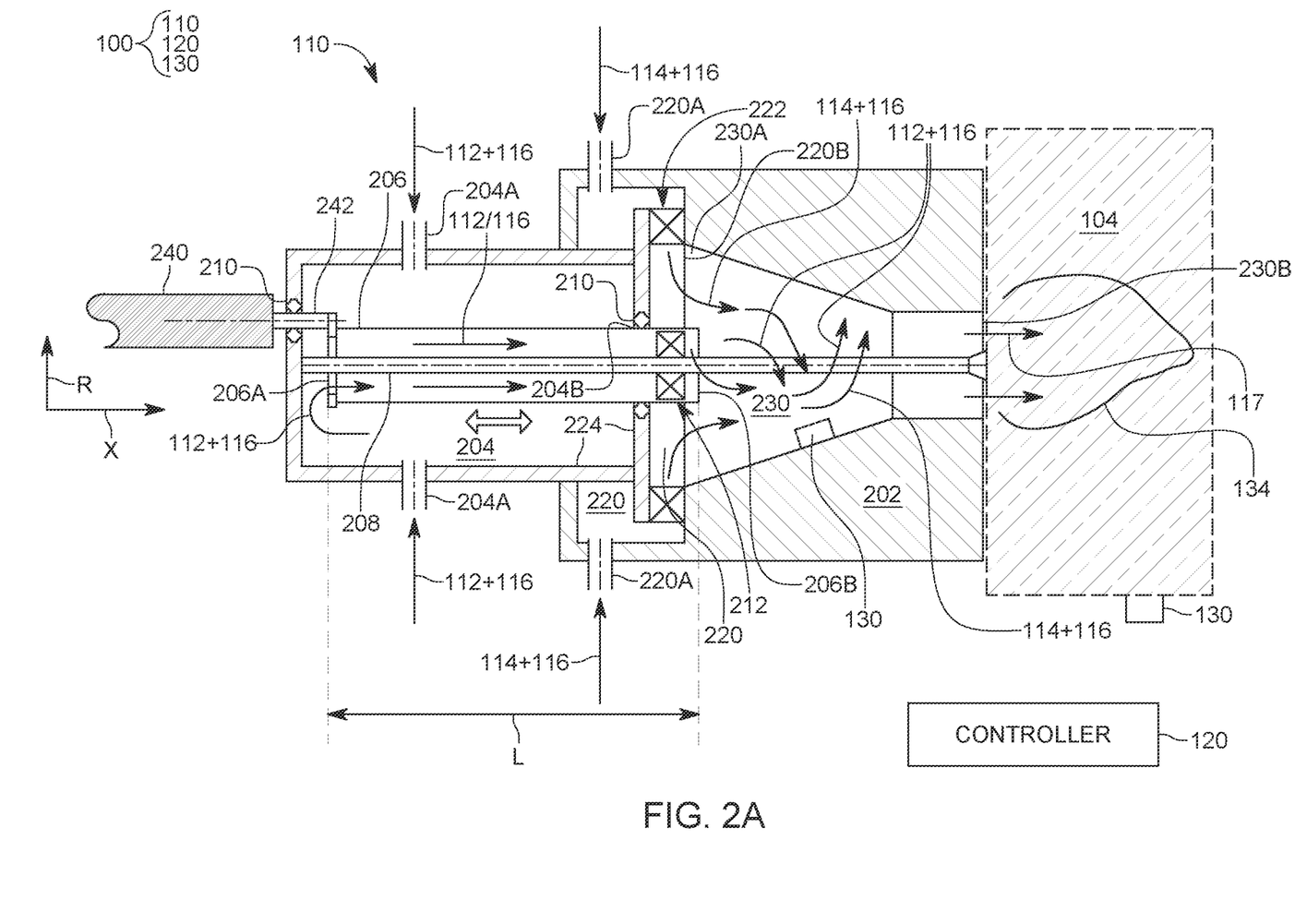
FIGS. 2A to 2C illustrate one implementation of an adjustable injector of the adjustable injector system that is configured to change the radial distribution of the mixed fuel injected inside the combustion chamber.
Figure 2B:
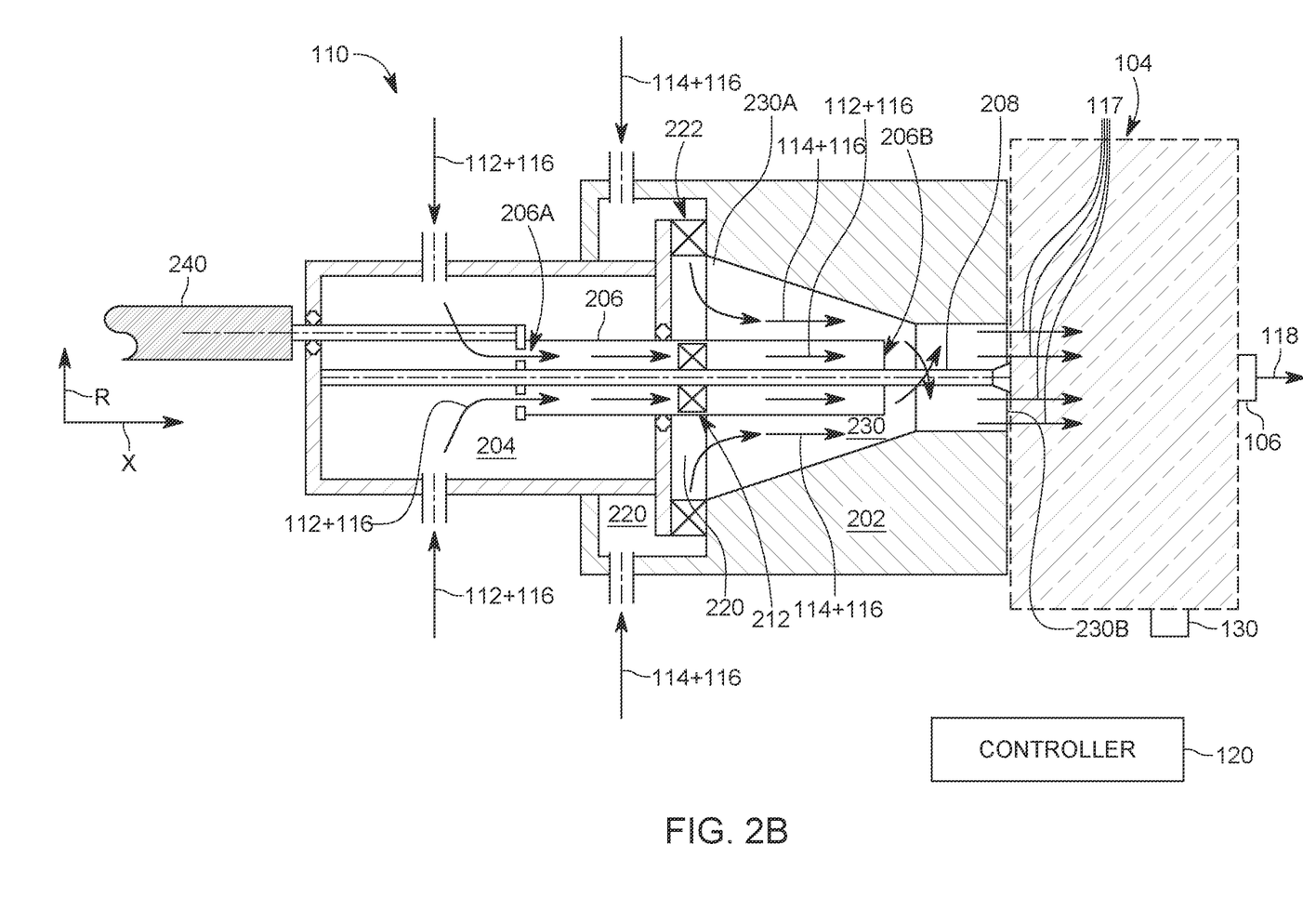
Figure 2C:
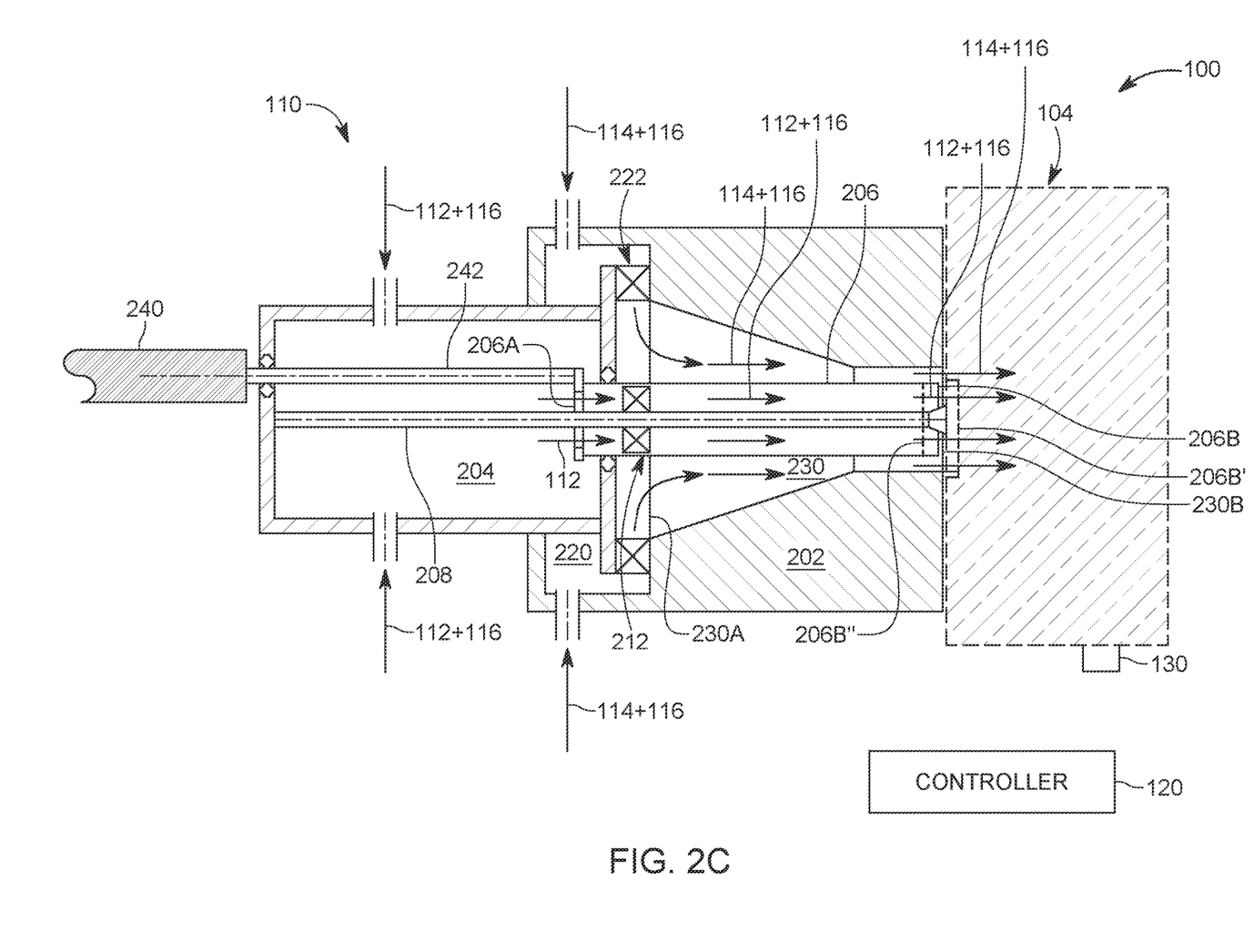

FIGS. 2A to 2C illustrate a specific implementation of the adjustable, multi-fuel, injector system 100, at various states during its usage. While these figures show particular elements that achieve the radial distribution of the mixed fuel, those skilled in the art would understand that other mechanisms may be used to achieve the same functionality with other element. Thus, the invention should not be construed narrowly with regard to only this implementation of the injector system 100.

More specifically, FIG. 2A shows the adjustable injector 110 having a housing 202 that hosts three internal chambers: a first fuel internal chamber 204, a second fuel internal chamber 220, and a third mixed fuel chamber 230. The first fuel internal chamber 204 has one or more inlets 204A that are configured to receive the first fuel 112 mixed with an amount of air 116. The first fuel chamber 204 hosts a sliding tube 206 having an inlet 206A and an outlet 206B. The sliding tube 206 is configured to translate inside the first fuel chamber 204, from a first state as shown in FIG. 2A, to a second state as shown in FIG. 2C. The first state corresponds to when more than half of the length L of the tube 206 is inside the first fuel chamber 204, and the second state corresponds to when more than half of the length L of the tube is within the third mixed fuel chamber 230.

The tube 206 is empty, has no holes or openings except for the inlet 206A and the outlet 206B, which are shown in the figure, and can be made of any metal or composite material that does not chemically interact with the fuels or change or affect the state of the fuels. The tube 206 is configured in this embodiment to slide along a rod 208, which extends along the longitudinal axis X of the injector 110. The rod 208 is fixed at both ends by being attached to the housing 202 and the rod is located inside the tub. In one application, the rod is located on the longitudinal axis of the tube. An actuator (for example, linear actuator) 240 is connected to the tube 206 and is configured to actuate the tube (translate it along the longitudinal axis X) in and out of the first fuel chamber 204. The actuator 240 may be an electrical motor having a link 242 that is configured to push and pull the tube 206. Various seals 210 may be provided between the link 242 and the housing 202 or between the tube 206 and the housing 202, as shown in FIG. 2A, to prevent the fuel from the first fuel chamber 204 to escape out of the chamber. The seals may also be selected to include materials that not only seal the fuel inside the chamber, but also promote the sliding of the link 242 and the tube 206 relative to the housing 202.

The tube 206 provides the only path for the first fuel 112 from reaching the third mixed fuel chamber 230, after entering the first fuel chamber 204, as indicated by the arrows labeled 112+116. In other words, the first fuel 112 may be mixed with air 116 prior to entering the first fuel chamber 204 through the one or more inlet ports 204A, then the fuel mix 112+116 enters the first fuel chamber 204 and continues to flow into the tube 206 through its inlet 206A and moves along the entire tube (on the longitudinal axis X), and it is finally discharged at the outlet 206B, into the third mixed fuel chamber 230, for the state shown in FIG. 2A. Note that this design is selected so that the first fuel 112 mixes for the first time with the second fuel 114 in the third mixed fuel chamber 230. This also means that the outlet port 204B of the first fuel chamber 204 is fully closed to the first fuel 112. As shown in FIGS. 2A to 2C, the outlet port 204B is fully blocked by the tube 206. Optionally, for achieving a good distribution of the first fuel 112, a gas mixer 212, for example, a swirler, may be placed inside the tube 206, and be attached to the rod 208, so that the swirler is fixed and does not move when the tube moves.

The second fuel chamber 220 is fluidly insulated from the first fuel chamber 204 and has one or more inlet ports 220A configured to receive the second fuel 114. The second fuel 114 may be mixed with air 116 prior to being delivered to the inlet port 220A. The second fuel chamber 220 may include a gas mixer 222, similar to the gas mixer 212. The gas mixer 222 is fixedly placed inside the second fuel chamber 220, for mixing the second fuel 114. After the second fuel 114 is mixed, it is delivered through the outlet port 220B, directly into the third mixed fuel chamber 230. FIGS. 2A to 2C show that the first and second fuel chambers 204 and 220 share common walls 224 of the housing 202.

The first fuel 112 and the second fuel 114 are shown in FIG. 2A as coming in contact with each other, for the first time, in the third mixed fuel chamber 230, with the first fuel 112 coming out directly from the tube 206 and the second fuel 114 coming out directly from the second fuel chamber 220. In this embodiment, the rod 208 extends along the entire length of the third mixed fuel chamber 230. However, in another implementation, the rod 208 can stop inside the first fuel chamber 204 or can be omitted if another actuating mechanism is used.

The fraction of the length L of the tube 206 that is present inside the third mixed fuel chamber 230 determines the radial distribution of the first and second fuels inside the combustion chamber 104. For example, FIG. 2A shows the tube 206 being in a fully retracted state, i.e., being fully retracted inside the first fuel chamber 204 and the second fuel chamber 220. The fully retracted state is defined herein as having only the output port 206B of the tube 206 entering the third mixed fuel chamber 230, but the entire body of the tube being located within the first and second fuel chambers 204 and 220. This means that for the fully retracted state, the first fuel 112 mixes with the second fuel 114 at the inlet 230A of the third mixed fuel chamber 230, and then the radially mixed fuel 117 is injected into the combustion chamber 104, at the outlet port 230B. Thus, the first and second fuels are mixed inside the third mixed fuel chamber 230 for the fully retracted state.

Figure 3:
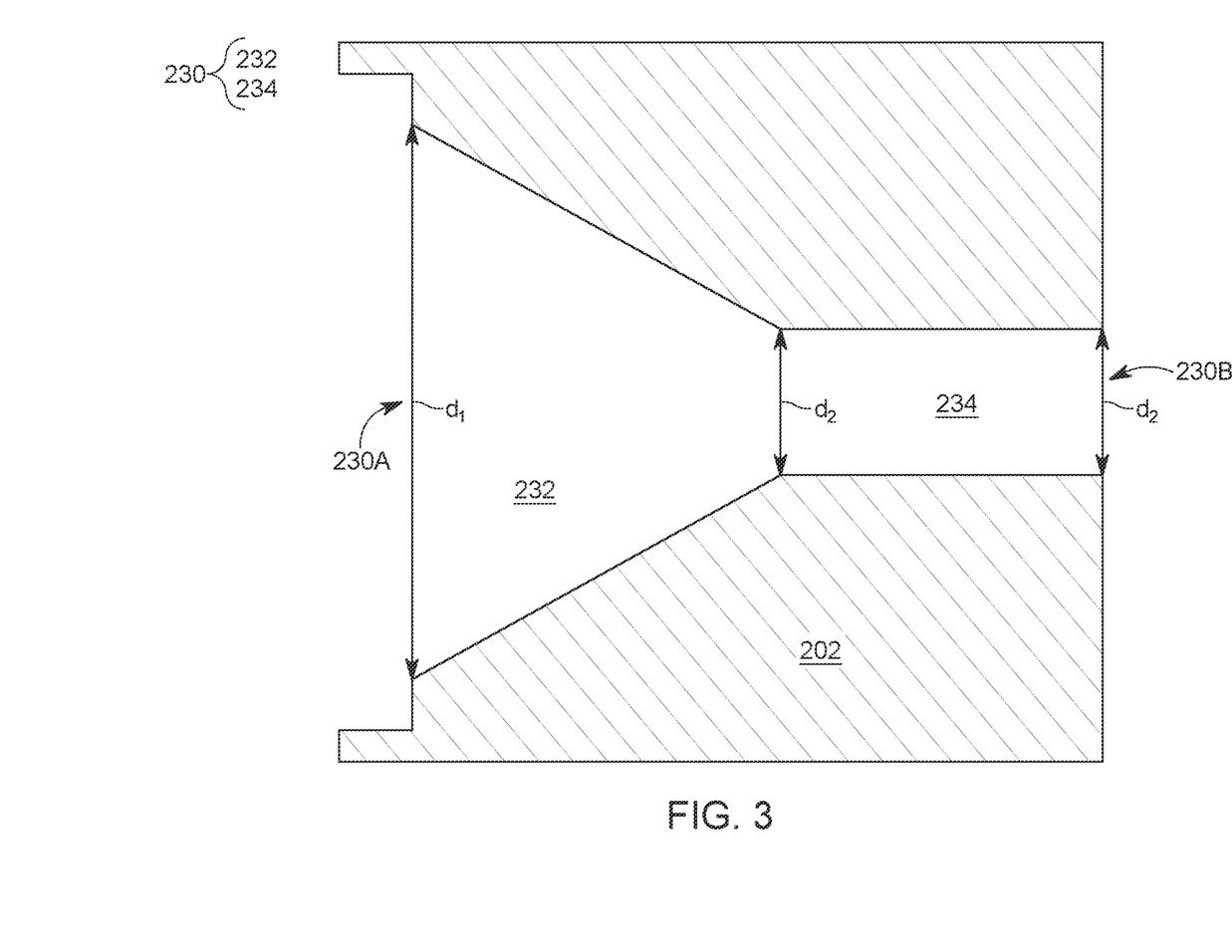
FIG. 3 shows in more detail an inside of the adjustable injector.

FIG. 2B shows the tube 206 being partially within each of the first fuel chamber 204, the second fuel chamber 220, and the third mixed fuel chamber 230. For this state, which is called herein the partially extended state, the mixing of the first and second fuels take place, for the first time, within the third mixed fuel chamber 230, away from the input port 230A and away from the output port 230B. In one embodiment, the mixing of the fuel within the third mixed fuel chamber 230 is modulated by the specific shape of the chamber. For example, as shown in FIG. 3, the third mixed fuel chamber 230 has a first chamber 232, which is shaped as a cone, and a second chamber 234, which is shaped as a cylinder. The first chamber 232 has a first diameter d1 at the inlet port 230A and a second diameter d2, smaller than the first diameter d1, when connecting to the second chamber 234. The second chamber 234 has a constant diameter d2 in this embodiment. The conical shape of the first chamber 232 assists with the mixing of the first and second fuels.

FIG. 2C shows the output port 206B of the tube 206 being flush with the outlet port 230B of the third mixed fuel chamber 230. In one application, the output port 206B' can be located slightly inside the combustion chamber 104, or the output port 206B" can be located slightly away from the output port 230B, i.e., fully within the third mixed fuel chamber 230, as shown by dashed lines in FIG. 2C. For either of these three possible locations of the output port 206B, the mixture of the first fuel 112 with the second fuel 114 effectively takes place inside the combustion chamber 104. Note that for this fully extended state, the tube 206 is mostly in the third mixed fuel chamber 230, with barely any part left inside the first fuel chamber 204.

Figure 4:
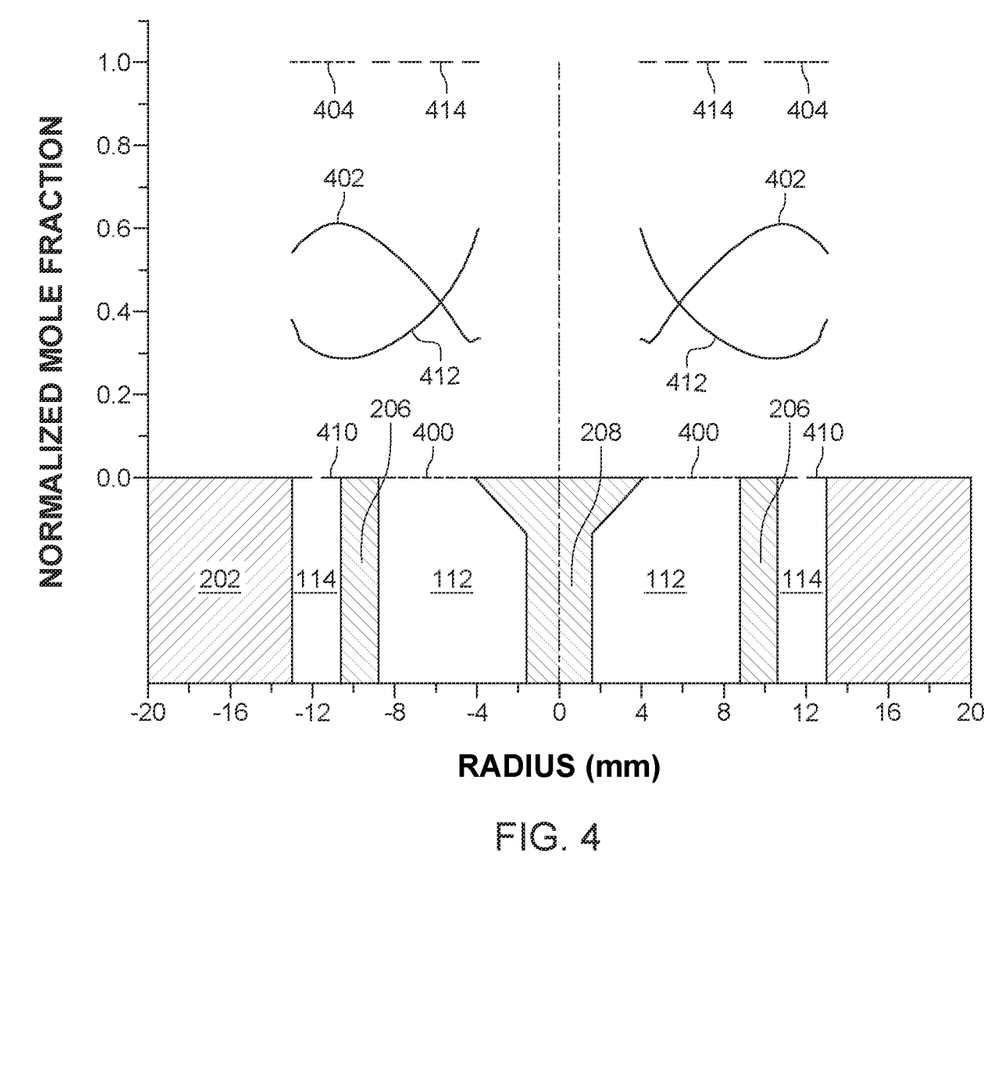
FIG. 4 illustrates the radial distribution of the mixed fuel inside the combustion chamber.

The various states exemplified in FIGS. 2A to 2C means that the initial mixing location of the first and second fuels can be adjusted anywhere, from the inlet port 230A all the way to the output port 230B of the third mixed fuel chamber 230. For any position between these two extreme positions, a different radial distribution of the mixed fuel 117 is obtained, as illustrated in FIG. 4. FIG. 4 shows at the bottom the relative locations of the rod 208, the tube 206, and the body 202 of the third mixed fuel chamber 230. The figure also shows the radial profiles (on the Y axis) of normalized mole fraction for the first fuel 112 (curves 400, 402, and 404 for the first fuel 112, i.e., hydrogen) and for the second fuel 114 (curves 410, 412, and 414 for the second fuel 114, i.e., ammonia). Curves 400 and 410 correspond to a region in the third mixed fuel chamber 230, immediately next to the inlet port 230A, i.e., when the inner tube 206 is fully recessed, which is representative of FIG. 2A. Curves 402 and 412 correspond to a region inside the third mixed fuel chamber 230, away from the inlet 230A or outlet 230B, which is representative of FIG. 2B. Curves 404 and 414 correspond to a region inside the combustion chamber 104 and represent the case where the tube is fully extended into the third mixed fuel chamber 230, which is representative of FIG. 2C.

The numerical simulations shown in FIG. 4 indicate the effect of the sliding tube 206's position on the mixing of the first fuel 112 (hydrogen) and the second fuel 114 (ammonia) at various locations inside the third mixed fuel chamber and at the entrance of the combustion chamber. The simulations support the claim that varying levels of fuel mixing along the radial direction could be attained with the proposed injector 110. These simulations were performed with a commercial software (Ansys-Fluent), using a RANS (Reynolds Averaged Navier-Stokes) approach. Normalization has been done with respect to the mole fractions for the inlet streams. As discussed above, for the case with no recession of the inner tube (representative of FIG. 2C), the hydrogen and ammonia exist as separate streams (dashed lines 404 and 414 in FIG. 4). As the inner tube 206 is recessed (representative of FIG. 2A), the two streams 112 and 114 start to mix and reach a certain level of mixture stratification (solid lines in FIG. 4). These results confirm that a recessing tube can be used to actively control the radial distribution of the two fuels inside the combustion chamber 104.

Note that the flame 134 in the embodiments illustrated in FIGS. 2A to 2C is stabilized over the tip of the rod 208, within the combustion chamber 104. Downstream of the swirlers 212 and 222, depending on the position of the sliding tube 206 within the third mixed fuel chamber 230, the two streams mix into a mixed stream 117, as shown in FIG. 2A, or the two streams 112 and 114 are injected as rotating co-flows, as shown in FIG. 2C. Between the fully mixed case (FIG. 2A) and the fully separated case (FIG. 2C), various radial gradients of the fuel mixing can be achieved by adjusting the position of the sliding tube to any intermediate position between the full retracted state and the fully extended state. The position of the sliding tube is adjusted by the actuator 240, as controlled by the output signal 126 of the closed-loop controller 120. The controller 120 can be connected in a wired or wireless manner to the sensor 130 and/or to the actuator 240.

Although the sensor 130 is shown in FIGS. 2A to 2C to be installed on the combustion chamber 104, the sensor 130 can be installed either downstream of the flame 134 (e.g., in the combustion chamber or in the exhaust system as shown in FIG. 2A), or upstream of the flame 134 (e.g., in the adjustable injector 110, for example, in the third mixed fuel chamber 230, as shown in FIG. 2A by a dash line). The bulk flows of fuels 112, 114 and air 116 are controlled by flow controllers (not shown), upstream of the adjustable injector 110, such as valves, or mass-flow controllers.

Figure 5:
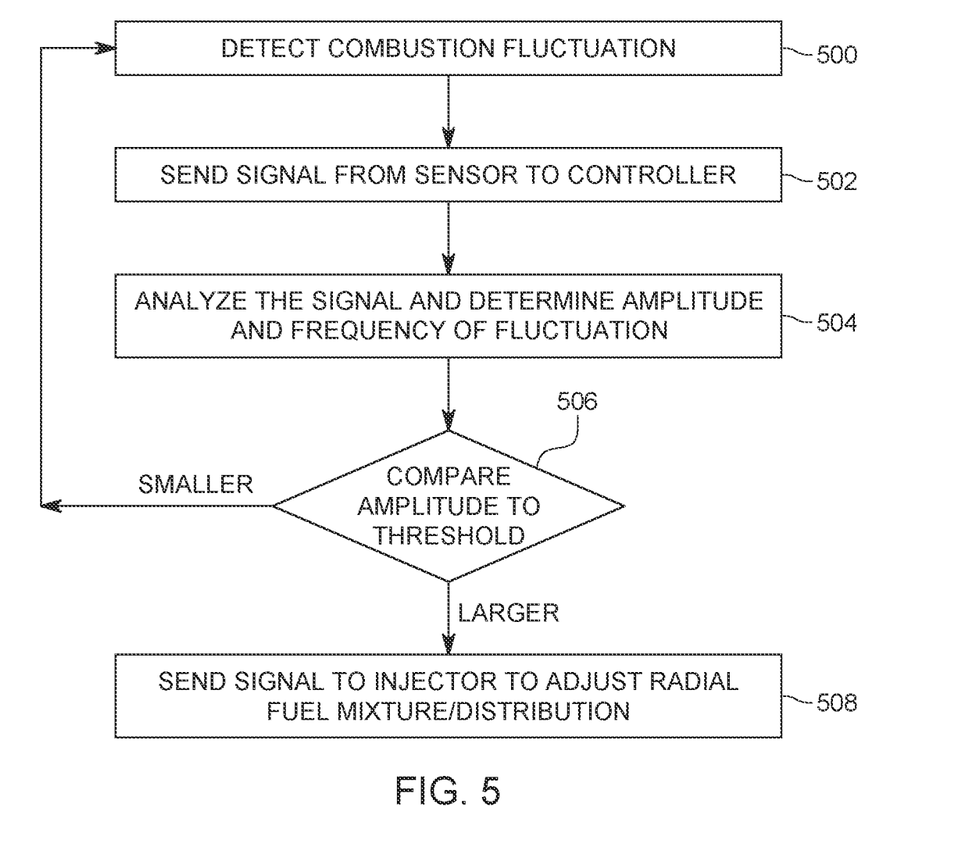
FIG. 5 is a flow chart of a method for controlling an adjustable injector for adjusting a radial distribution of a mixed fuel injected into a combustion chamber.

The operation of the injector system 100, when implemented in the gas turbine 102, is now discussed with regard to FIG. 5. For a given operating condition of the gas turbine 102, either during ramp-up or -down, or during a steady-state operation, the flame in the combustion chamber 104 can become unstable, leading to strong pressure fluctuations. The injector system 100 may be used as many times as necessary, to suppress the thermo-acoustic instability of the flame and the corresponding pressure fluctuations.

In step 500, the sensor 130 detects the combustion fluctuations, which are associated with the flame 134 instability. The sensor can be a pressure sensor, a microphone, or an optical device. The output signal 132 from the sensor 130 is sent in step 502 to the closed-loop controller 120. Alternatively, several sensors can be used to detect the combustion fluctuations, located upstream or downstream of the flame, or both. The sensor or sensors can be commercially available devices or specially made to be integrated into the combustion system.

In step 504, the closed-loop controller 120 analyses the signal(s) 132 coming from the sensor(s) 130. For a given threshold value, which needs to be adjusted depending on the sensor's characteristics and the combustion system 102 that hosts the injector system 100, the controller 120 sends in step 506 an output signal 126 to the adjustable injector 110. The nature of this signal depends on the technology used in the adjustable injector. The closed-loop controller 120 is an electronic system with input and output connected to the sensor 130 and the injector 110, respectively. The electrical signal 132 may be collected via an acquisition port or card (e.g., National Instrument acquisition card) and then analyzed by a software stored in the memory 124. The output of the software is a voltage signal 126, which is able to control the adjustable injector 110, more specifically, the actuator 240, e.g., with a transistor-transistor logic (TTL) signal or a +/−5 V analog signal.

The software analyzes in step 504 the signal 132 and determines the amplitude and frequencies of the combustion fluctuations. When the flame becomes unstable, the amplitude of the fluctuation at a given frequency will gradually increase. In step 506, the determined amplitude is compared to a threshold value of the amplitude, and if the determined amplitude is larger than the threshold value, the control signal 126 is generated and sent in step 508 to the adjustable injector 110 for adjusting the mixture of the two fuels. For example, the signal may include a new direction and/or magnitude for changing the tube 206 inside the adjustable injector 110, to achieve a desired change in the radial fuel distribution, to make the flame stable. This change in the radial fuel distribution is achieved by moving forward or backward the sliding tube 206, by using the linear actuator 240.

In the initial operational period, an artificial neural network (ANN) may be implemented in the processor 122 and memory 124. The ANN is used to train the software to determine the direction and the magnitude of the tube's displacement produced by the linear actuator to mitigate the flame's instabilities. The oscillations of the flame may be measured and analyzed in real time, and the effect of the injection actuation is then analyzed and characterized also in real time. Thus, the output signal 126 of the closed-loop controller 120 can be adjusted to suppress the pressure oscillations due to the thermo-acoustic instabilities.

If the amplitude determined in step 506 is smaller than the threshold value, the process returns to step 500 for detecting again the combustion fluctuation, if one exists. In step 508, the adjustable injector adjusts the radial fuel distribution inside the gas turbine. In one embodiment, the same global injection settings are maintained, i.e., same flow rates of each fuel, while adjusting the radial distributions of the hydrogen and ammonia inside the combustion chamber. This can be done, as discussed above with regard to FIGS. 2A to 2C, by sliding the tube 206 in and out of the third mixed fuel chamber to change the local mixture fraction at or before entering the combustion zone. Thus, by adjusting the radial mixture of the fuels, the shape and stabilization mechanism of the flame are adjusted, while the bulk velocity and equivalence ratio and, in turn, the thermal power released by the flame and the amount of each fuel burned are kept constant. As shown in [2, 3], the flame shape is a key parameter in thermo-acoustic instability. Therefore, gradually changing the flame's shape by modifying the local burning properties, the fluctuations of the flame and the pressures inside the combustion chamber can be suppressed and the combustion stabilized.

Currently, the most common way to control flame dynamics in gas turbine engines is by performing a stability map, and then avoiding conditions for which the probability of thermo-acoustic coupling becomes too large. For specific operating conditions, passive systems such as dampers (large cavities) can be installed. These techniques are efficient, but they are adjusted to a specific operating condition. Replacing fossil fuel by hydrogen, ammonia, or blends of these two fuels would make this approach inoperable. Other strategies, for example, using an additional fuel when an instability arises have also been proposed. However, these solutions change the heat produced by the combustion system, and they are not developed for carbon free fuels. Note that for the proposed injector system, the fuel flows into the combustion chamber are maintain constant, only their radial distribution is modified. In other words, for this embodiment, the amount of fuels entering the combustion chamber is not changed by the adjustable controller.

Thus, the injector system discussed herein not only changes the radial distribution of the mixed fuel to stabilize the flame for various conditions, but also maintains the heat produced by the gas turbine (or other system that hosts the injection system 100) and uses non-carbon based fuels.

The disclosed embodiments provide an injector system that is configured to control a flame's stability by adjusting a radial distribution of the mixed fuel inside the combustion chamber. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

[1] T. C. Lieuwen, V. Yang, Instabilities in Gas Turbine Engines, vol. 210 of Progress in Astronautics and Aeronautics, AIAA, Reston, V A, 2005.
[2] D. A. Lacoste, Y. Xiong, J. P. Moeck, S. H. Chung, W. L. Roberts, M. S. Cha, Transfer functions of laminar premixed flames subjected to forcing by acoustic waves, AC electric fields, and non-thermal plasma discharges, Proc. Combust. Inst. 36, 2017, 4183-4192.
[3] K. T. Kim, J. G. Lee, H. J. Lee, B. D. Quay, D. A. Santavicca, Characterization of forced flame response of swirl-stabilized turbulent lean-premixed flames in a gas turbine combustor, J. Engineering Gas Turbines Power 132, 2010, 041502.
[4] T. F. Guiberti, D. Durox, L. Zimmer, and T. Schuller. Analysis of topology transitions of swirled flames interacting with the combustor side wall. *Combust. Flame,* 162, 2015, 4342-4357.
[5] T. F. Guiberti, D. Durox, P. Scouflaire, and T. Schuller. Impact of heat loss and hydrogen enrichment on the shape of confined swirling flames. *Proc. Combust. Inst.* 35, 2015, 1385-1392.

What is claimed is:
1. An adjustable injector system for adjusting a radial distribution of a mixed fuel, the adjustable injector system comprising:
  an adjustable injector configured to receive first and second non-carbon fuels at first and second fuel chambers, respectively, and configured to adjust the radial distribution of the mixed fuel, within a third mixed fuel chamber, with a movable part, wherein the mixed fuel is obtained from mixing the first non-carbon fuel with the second non-carbon fuel and an outlet port, of the first fuel chamber, that opens into the second fuel chamber is fully blocked by the movable part;
  a sensor configured to determine an instability of a flame generated by the mixed fuel; and
  a controller electrically connected to the adjustable injector and the sensor, and configured to change a configuration of the adjustable injector, based on an input signal from the sensor, to control the radial distribution of the mixed fuel.
2. The adjustable injector system of claim 1, wherein the adjustable injector comprises:

a body having the first fuel chamber, the second fuel chamber, and the third mixed fuel chamber arranged in series.

3. The adjustable injector system of claim 2, wherein the first fuel chamber fluidly communicates, through the movable part, with the third mixed fuel chamber when the movable part is fully or partially retracted, and fluidly communicates, through the movable part, directly with a combustion chamber when the movable part is fully extended.

4. The adjustable injector system of claim 2, wherein the adjustable injector comprises:
an actuator connected to the movable part and configured to translate the movable part along a longitudinal axis of the body, between a fully retracted position and a fully extend position.

5. The adjustable injector system of claim 4, wherein for the fully retracted position, the movable part extends within the first and second fuel chambers, and for the fully extended position, the movable part extends within the first and second fuel chambers and the third mixed fuel chamber.

6. The adjustable injector system of claim 4, wherein for the fully retracted position, the first non-carbon fuel is discharged directly into the third mixed fuel chamber, from an outlet port of the movable part, and for the fully extended position, the first non-carbon fuel is discharged directly into the combustion chamber, from the outlet port of the movable part.

7. The adjustable injector system of claim 1, wherein the mixed fuel is non-carbon.

8. The adjustable injector system of claim 1, wherein the controller is configured to calculate an amplitude of a fluctuation of the flame from a stable position.

9. The adjustable injector system of claim 8, wherein the controller compares the amplitude of the flame fluctuation with a threshold value, and when the calculated amplitude is larger than the threshold value, the controller instructs the adjustable injector to change a position of the movable part to adjust the radial distribution of the mixed fuel.

10. The adjustable injector system of claim 1, wherein when the movable part is fully extended, the first non-carbon fuel is injected from the first fuel chamber, through the movable part, directly into a combustion chamber, and when the movable part is fully retracted, the first non-carbon fuel is injected from the first chamber, through the movable part, at an inlet of the third mixed fuel chamber.

11. The adjustable injector system of claim 1, wherein the sensor is a pressure sensor or an optical sensor.

12. An adjustable injector for adjusting a radial distribution of a mixed fuel in the adjustable injector comprising:
a body having a first fuel chamber configured to receive a first non-carbon fuel, a second fuel chamber configured to receive a second non-carbon fuel, and a third mixed fuel chamber configured to receive the mixed fuel, which is a mixture of the first fuel and the second fuel;
a tube that extends into the first and second fuel chambers when the tube is in a fully retracted state, and extends into the first and second fuel chambers and the third mixed fuel chamber when the tube is in a fully extended state; and
an actuator connected to the tube and configured to translate the tube along a longitudinal axis of the body, between the fully retracted position and the fully extend position, to adjust a radial distribution of the first and second non-carbon fuels inside the mixed fuel.

13. The adjustable injector of claim 12, wherein the first fuel chamber fluidly communicates, through the tube, with the third mixed fuel chamber when the movable part is fully or partially retracted, and fluidly communicates, through the tube, with a combustion chamber when the movable part is fully extended.

14. The adjustable injector of claim 12, wherein for the fully retracted position, the first non-carbon fuel is discharged directly into the third mixed fuel chamber, from an outlet port of the tube, and for the fully extended position, the first non-carbon fuel is discharged directly into a combustion chamber, from the outlet port of the tube.

15. The adjustable injector of claim 12, wherein the mixed fuel is non-carbon.

16. The adjustable injector of claim 12, further comprising:
a first mixing device located inside the tube and configured to mix the first non-carbon fuel with air; and
a second mixing device located inside the second fuel chamber and configured to mix the second non-carbon fuel with the air.

17. The adjustable injector of claim 12, further comprising:
a rod extending from one end of the body to an opposite end of the body,
wherein the tube is configured to slide along the rod when actuated by the actuator.

18. The adjustable injector of claim 12, wherein when the movable part is fully extended, the first non-carbon fuel is injected from the first fuel chamber, through the movable part, directly into a combustion chamber, and when the movable part is fully retracted, the first non-carbon fuel is injected from the first chamber, through the movable part, at an inlet of the third mixed fuel chamber.

19. A method for controlling a radial distribution of a mixed fuel within a combustion chamber of a gas turbine, the method comprising:
detecting with a sensor a fluctuation of a flame within a combustion chamber;
transferring from the sensor to a controller a signal indicative of the fluctuation of the flame;
determining in the controller an amplitude of the fluctuation of the flame, based on the signal indicative of the fluctuation of the flame;
comparing the determined amplitude of the fluctuation of the flame with a given threshold value; and
instructing an adjustable injector to change a radial distribution of first and second non-carbon fuels inside the combustion chamber to decrease the amplitude of the fluctuation of the flame,
wherein the first and second non-carbon fuels are received at first and second fuel chambers, respectively, and mixed within a third mixed fuel chamber to generate the flame, and
wherein an outlet port, of the first fuel chamber, that opens toward the second fuel chamber is fully blocked by a movable part of the adjustable injector.

20. The method of claim 19, further comprising:
calculating a direction of moving a movable part in the adjustable injector based on the signal, which is indicative of the fluctuation of the flame,
wherein the calculation uses a trained neural network.

* * * * *